US008561875B2

(12) United States Patent
Hattass et al.

(10) Patent No.: US 8,561,875 B2
(45) Date of Patent: Oct. 22, 2013

(54) METHOD AND DEVICE FOR CONNECTING PIPES; MOTOR VEHICLE WITH A DEVICE OF THIS TYPE

(75) Inventors: Dirk Hattass, Gründau (DE); Volker Naumann, Bad Orb (DE); Peter Kahn, Erlensee (DE)

(73) Assignee: Veritas AG, Gelnhausen (DE)

( * ) Notice: Subject to any disclaimer, the term of this patent is extended or adjusted under 35 U.S.C. 154(b) by 1837 days.

(21) Appl. No.: 11/226,422

(22) Filed: Sep. 15, 2005

(65) Prior Publication Data

US 2006/0060634 A1  Mar. 23, 2006

(30) Foreign Application Priority Data

Sep. 17, 2004  (DE) .................. 10 2004 045 135

(51) Int. Cl.
*B23K 20/12* (2006.01)
(52) U.S. Cl.
USPC ......... 228/101; 228/2.3; 285/288.1; 156/73.5
(58) Field of Classification Search
USPC ............ 228/8, 9.102, 103, 43, 44.3, 114.5, 9, 228/102, 101, 2.1, 2.3, 112.1; 156/64, 73.5, 156/580; 285/288.1, 288.6, 423
See application file for complete search history.

(56) References Cited

U.S. PATENT DOCUMENTS

| | | | |
|---|---|---|---|
| 3,678,566 A | | 7/1972 | Ellis et al. |
| 3,779,446 A | * | 12/1973 | Lemelson ................ 228/15.1 |
| 3,980,248 A | * | 9/1976 | Minoshima ............... 242/118.7 |
| 5,152,855 A | * | 10/1992 | Jansman et al. ............ 156/73.5 |
| 5,154,340 A | * | 10/1992 | Peacock ................... 228/114.5 |
| 5,636,875 A | * | 6/1997 | Wasser ...................... 285/21.1 |
| 5,858,142 A | | 1/1999 | Tully et al. |
| 5,941,422 A | | 8/1999 | Struble |
| 6,199,916 B1 | * | 3/2001 | Klinger et al. ............ 285/288.1 |
| 6,712,401 B2 | * | 3/2004 | Coulon et al. ............... 285/331 |
| 6,733,047 B1 | * | 5/2004 | Stieler ....................... 285/319 |
| 6,832,785 B1 | * | 12/2004 | Zitkovic, Jr. ................ 285/21.1 |
| 6,902,208 B1 | * | 6/2005 | Mobley et al. ............... 285/331 |
| 2005/0285393 A1 | | 12/2005 | Hatass et al. |

FOREIGN PATENT DOCUMENTS

| | | |
|---|---|---|
| DE | 39 03 551 A1 | 8/1989 |
| DE | 39 41 236 A1 | 6/1990 |
| DE | 195 23 240 C1 | 3/1997 |
| DE | 297 23 570 U1 | 12/1998 |
| DE | 199 02 357 A1 | 8/2000 |
| DE | 199 17 071 A1 | 10/2000 |
| EP | 0 988 488 B1 | 3/2000 |

(Continued)

OTHER PUBLICATIONS

Richtlinie DVS 2218 Teil 1, Feb. 1994, pp. 1-7.

(Continued)

*Primary Examiner* — Roy King
*Assistant Examiner* — Michael Aboagye
(74) *Attorney, Agent, or Firm* — Buchanan Ingersoll & Rooney PC

(57) ABSTRACT

The invention relates to a method for shaping pipes with the steps
  connecting a pipe end with a coupling of a connection device for pipes, in particular a quick connector, through friction welding and
  controlling the region of formation of the molten mass formed during friction welding.
The contamination of the inside of the pipe due to welding beads can be prevented with the aid of the invention.

11 Claims, 2 Drawing Sheets

(56) References Cited

FOREIGN PATENT DOCUMENTS

Figure 1:
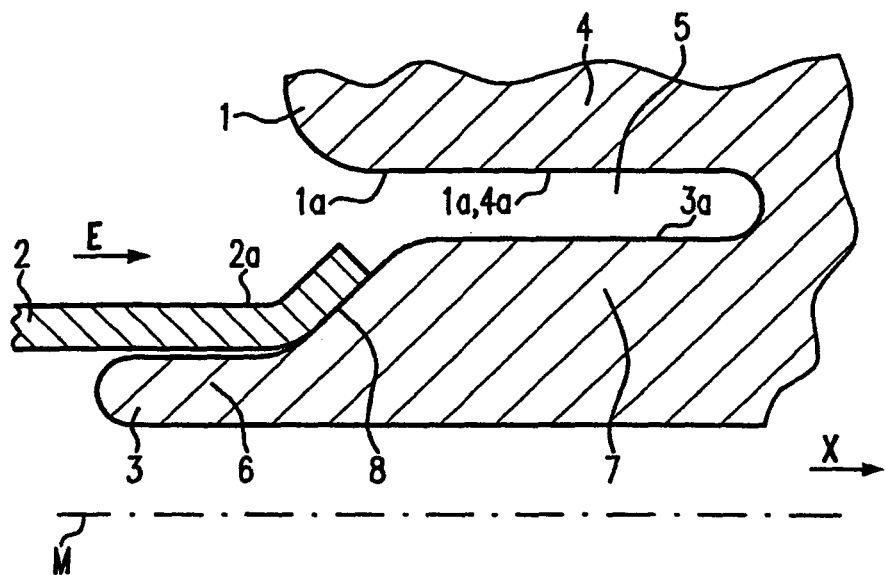

| EP | 1 087 167 A2 | 3/2001 |
| EP | 1 604 805 A1 | 12/2005 |
| JP | 57-125011 A | 8/1982 |
| WO | 98/57092 A1 | 12/1998 |

OTHER PUBLICATIONS

Notification from German Patent Office.

* cited by examiner

METHOD AND DEVICE FOR CONNECTING PIPES; MOTOR VEHICLE WITH A DEVICE OF THIS TYPE

The invention relates to a method and a device for connecting pipes and to a motor vehicle with a device of this type.

A device for connecting pipes to at least one coupling, which is adapted for connection to a pipe end by friction welding, is for example known from EP 0 988 488 B1.

The known device has the disadvantage that on connecting the device to a pipe by friction welding, abrasion particles are formed, which penetrate inside the pipe and contaminate it. The abrasion particles are produced by the emission of molten mass formed during friction welding, which as granules penetrate inside the pipe.

In particular with the use of fuel pipes, this sort of contamination is particularly detrimental.

An object of the invention is to provide a method and a device for connecting pipes, by which the contamination of pipes during their connection by friction welding can be prevented or at least reduced. Furthermore, a motor vehicle with this type of device is also to be provided.

The invention has the advantage that by controlling the region where the molten mass is generated during the friction welding, the melting area, i.e. the welding point, can be spatially displaced. In this way the welding point can in particular be moved to such locations, which are favourable with regard to preventing the emission of molten mass into the inside of the pipe. Through appropriate control of the location where the molten mass is generated, the possibility is thus provided for local displacement of the welding point, enabling the generation of the molten mass to be moved from the locations which are critical with regard to the undesired emission of molten mass to comparatively uncritical locations.

The prevention or reduction in the formation of abrasion particles during friction welding which can be achieved with the invention signifies a substantial improvement in safety, in particular in the field of automotive technology, because the detrimental contamination of fuel pipes caused by friction welding no longer occurs or only to a reduced extent. In addition, the invention improves the possibility of automating the production of pipe joints due to friction welding, because cleaning of the pipes which was previously required after friction welding is no longer needed.

In a preferred embodiment of the method according to the invention a contact pressure between the pipe end and the coupling is produced essentially locally in the region where the molten mass is generated. The specific generation of the contact pressure in a simple way facilitates a local control of the region of generation of the molten mass so that the welding point or the melting region can be positioned away from the critical points emitting molten mass to less critical points.

In a further particularly preferred embodiment of the method according to the invention the end of the pipe and the coupling are brought together in a first step by an essentially linear relative movement, whereby the pipe end and the coupling are moved relative to one another up to a predetermined position or until a predetermined resistance is obtained. In a second step the pipe end and the coupling are welded by an essentially rotational relative movement under pressure. Due to the controlled, linear movement of the pipe end and the coupling relative to one another, the location at which molten mass is generated can be influenced. Moreover, the quantity of molten mass can be controlled in that the pipe end and the coupling are moved relative to one another up to a predetermined specified position. Precise control of how much molten mass is to be generated during friction welding can be achieved by selectively setting this predetermined position. In this way it can be better ensured that no molten mass is emitted into the inside of the pipe, because only that quantity of welding deposit required for a sufficiently strong welded joint is generated.

Alternatively, it is possible to move the pipe end and the coupling relatively towards one another until a predetermined resistance is obtained, in particular a predetermined mechanical frictional resistance. The setting of this predetermined resistance enables the amount of molten mass to be controlled such that the formation of an amount required for a strong welded joint is facilitated without producing an excess of molten mass which may possibly be emitted into the inside of the pipe.

The multi-step feature of the method, i.e. the execution of an essentially linear relative movement in a first step followed by an essentially rotational relative movement in a second step, prevents the pipe end from being melted already on insertion into the coupling. Rather, the multi-step method supports a selective melting of the pipe end in the rear coupling section, which forms a favourable region with regard to the prevention of the emission of molten mass into the inside of the pipe. Moreover, the separation of the process steps of joining and welding offers higher flexibility when implementing the method, because the parameters of the individual steps can be more easily influenced so that the method overall can be better controlled.

Preferably the essentially linear relative movement between the end of the pipe and the coupling is controlled by displacement. The displacement controlled implementation of the linear relative movement between the pipe end and the coupling facilitates a precise setting of the desired position of the pipe end with respect to the coupling or vice versa, because, in the course of the displacement control, manufacturing tolerances, in particular with regard to the length dimension or the wall thickness of the components can be well compensated.

The displacement control of the essentially linear relative movement can be carried out in dependence of the wall thickness and/or of the diameter of the pipe end. In this way the process stability is improved, because, by taking into account the wall thickness or the diameter of the pipe end, the accompanying variable amount of molten mass can be controlled. In particular, the distance determined by the displacement controlled, essentially linear relative movement can be reduced with increasing wall thickness of the pipe end. Since it has been shown that with increasing wall thickness also the amount of welding deposit is increased, the amount of welding deposit can be reduced to a sufficient and favourable amount to ensure the realisation of the method by an appropriate reduction of the distance travelled in the course of the linear relative movement.

In a further preferred embodiment of the method according to the invention a diameter of the pipe end is changed at least in the first step, in particular enlarged, whereby compressive stresses are produced in the pipe end which give rise to a radially acting contact pressure. With an appropriately large change in diameter the compressive stresses produced in the end of the pipe and the contact pressure resulting from them, which in turn affects the amount of welding deposit, can be selectively controlled.

The change of diameter of the pipe end can occur along a curved path determined by the profile of the coupling. The curve shaped course of the change in diameter, caused by the corresponding coupling profile, prevents stress peaks in the material of the pipe end from occurring and thus prevents locally undesired formation of molten mass, in particular in the transition region from the smaller diameter to the larger diameter of the coupling.

In certain cases it has proven to be favourable if in the first step the essentially linear relative movement is superimposed with a rotational relative movement for heating up the pipe end and the coupling. Due to the selective heating of the pipe end, its flaring behaviour can be influenced, whereby the occurrence of undesired stress peaks in the pipe end material can be avoided still further. In addition, due to the setting of a certain preheating temperature, the radial contact pressure is controlled, resulting in a further way of influencing the generation of the amount of molten mass.

In a further preferred embodiment of the invention the diameter of the pipe end is modified, in particular enlarged, before joining to the coupling of the joining device. Through flaring the pipe end before inserting the pipe end into the coupling, the occurrence of stress peaks in the material of the pipe end can be avoided. The change of the diameter of the pipe end before joining with the coupling of the joining device can be combined with the aforementioned embodiments. For example, it is possible to change the diameter of the pipe end and then to carry out the multi-step method of joining the pipe to the coupling of the joining device.

Furthermore, it is possible to form different diameters in the longitudinal direction of the pipe end when modifying the diameter of the pipe end. The diameters, which are formed differently in the longitudinal direction of the pipe end facilitate a selective loading of certain regions of the coupling with a suitable contact pressure determined by the respective diameter.

In certain cases it has proven effective to enlarge the diameter of the pipe end such that the diameter of an external surface of the pipe end is formed slightly larger than the diameter of an internal surface of the coupling which comes into contact with the external surface of the pipe end. In this way, welding of the external surface of the pipe end with an internal surface of the coupling is facilitated.

A further possibility for the control of the region where the molten mass is generated during friction welding can be obtained according to a further embodiment of the invention in that the contact surfaces of the pipe end and/or of the coupling are provided with a lubricant, at least in some areas. In this manner the friction between the coupling and the pipe end is reduced locally in the regions in which the formation of molten mass is to be avoided.

With regard to the device according to the invention provision can be made that the coupling comprises an internal connecting piece, the external surface of which is provided with a lubricant, at least in some areas. Alternatively or additionally, the internal surface of an external connecting piece on the coupling can be provided with a lubricant, at least in some areas. In this way, the possibility is created of either only welding on the internal surface of the external connecting piece or only on the external surface of the internal connecting piece when the respective other surface is provided with lubricant. In addition, the respective surfaces can be only partially provided with lubricant so that only the regions free of lubricant on the respective surfaces weld together due to the higher friction.

The invention is explained in the following based on schematic drawings of examples and with further details.

Figure 2:
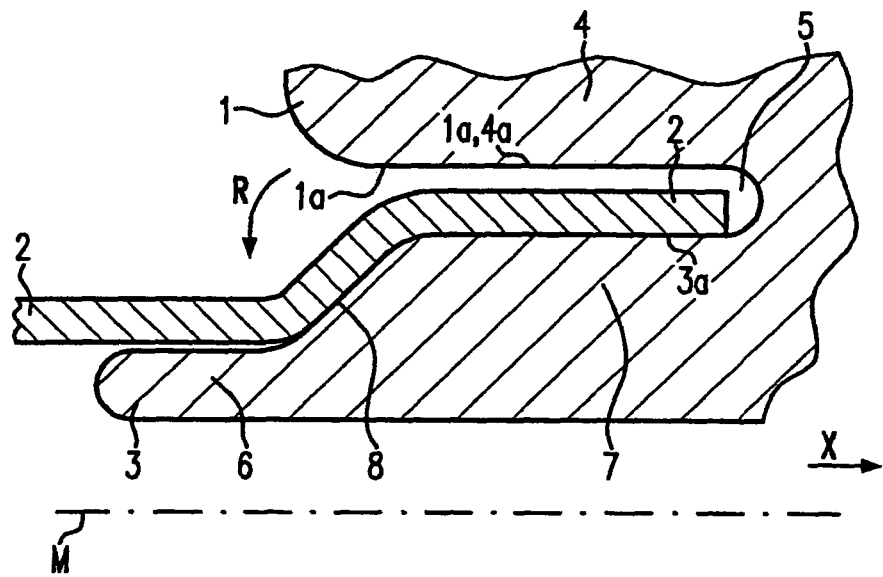
Figure 3:
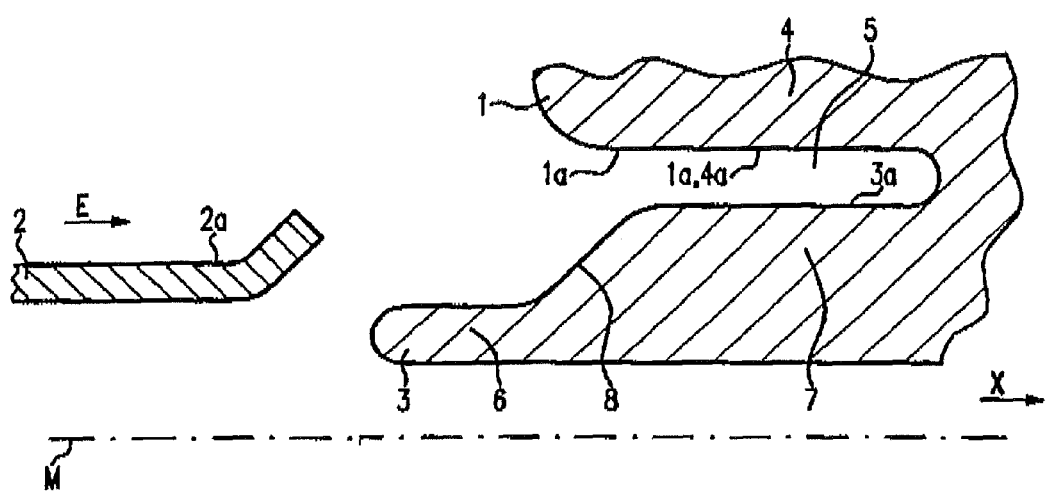

The following are illustrated:

FIG. 1 a partial section in the longitudinal direction of a connection device on which a pipe end has been pushed, and FIG. 2 the connection device according to FIG. 1, whereby the pipe end has moved into the position provided for friction welding.

In FIGS. 1 and 2 the main steps in a method according to one embodiment of the invention are explained based on a connection device in the form of a quick connector. The use of the connection device illustrated in FIGS. 1 and 2 within the scope of the method is preferred, because particularly good results can be achieved when connecting the device to a pipe. The implementation of the method is however not restricted to the connection device illustrated in FIGS. 1 and 2. Rather, also connection devices with other cross-section geometries can be used within the scope of the method.

The connection device illustrated in FIGS. 1 and 2 is shown as an extract and in fact in the region of the coupling 1 of the connection device. The connection device is formed rotationally symmetrical with respect to the central axis M, whereby the cross-sectional region of the connection device not illustrated in FIGS. 1 and 2 and arranged below the central line M corresponds to the cross-sectional region illustrated in FIGS. 1 and 2.

The connection device comprises a further coupling which is not illustrated and which is arranged in the longitudinal direction X of the connection device, coaxially opposed to the coupling 1. The coupling 1 comprises an internal connecting piece 3 and an external connecting piece 4 arranged essentially concentrically to the internal connecting piece 3. Between the internal connecting piece 3 and the outer connecting piece 4 an annular gap 5 is formed for the accommodation of a pipe end 2 of a pipe which is to be connected. The internal connecting piece 3 is formed with an entry section 6 and with a retaining section 7, whereby the diameter of the retaining section 7 is larger than the diameter of the entry section 6. The entry section 6 is arranged in front of the retaining section 7 in the insertion direction E of the pipe end 2. The entry section 6 acts as a guide for the pipe end 2 when fitting the pipe end 2 onto the coupling 1. The welded point produced by the friction welding is positioned in the retaining section 7 which represents the region which is responsible for the reliable connection between the coupling 1 and the pipe end.

A transition region 8, which compensates for the difference in diameters between the entry section 6 and the retaining section 7, is provided between the entry section 6 and the retaining section 7. As illustrated in FIGS. 1 and 2, this transition region 8 is formed with a curved shape.

With regard to the further configuration of the connection device illustrated in FIGS. 1 and 2, reference is made to the German patent application with the file number 10 2004 027 831.8 by the applicant.

This connection device is in particular provided for the connection of fuel pipes in motor vehicles, but can also be used in other technical fields in which a reliable connection of pipes for the transport of fluid or gaseous media is required.

The connection of the pipe end 2 with the coupling 1 of the connection device, i.e. of the quick connector, occurs by friction welding. Here, the expression "connection of pipes" is taken to mean the joining of a single pipe with the quick connector coupling as well as the joining of at least two lines with the aid of the quick connector, which is fixed firmly joined on one side of the connection to a pipe end by friction welding and on the other side of the connection to another pipe end, for example by means of a clip which is not illustrated.

During friction welding the region is controlled where the molten mass is formed. The term "control" means both the control of the method by an open-loop signal circuit as well as the closed-loop control of the method within the scope of a closed signal circuit in which the controlled output quantity reacts on the input quantity to be controlled.

Through the control of the region where the molten mass occurs during friction welding, the local position of the location of molten mass formation is selectively changed. This means that the location of molten mass formation is for example moved backwards in the insertion direction E into a rear section of the retaining section 7.

Furthermore, the control of the region where the molten mass formation occurs during friction welding can result in a change in the regional limits in the sense that the molten mass formation region is changed in terms of area and, in particular, is limited. From that point of view a region which is smaller in terms of area can be obtained by controlling the molten mass formation region than compared with an uncontrolled method.

Due to the controlled change in the local position of the location of molten mass formation and also due to the area limitation of the region of formation, molten mass can be prevented from penetrating between the internal side of the pipe end 2 and the external surface of the internal connecting piece into the inside of the pipe and resulting in contamination of the pipe in the form of granules or abrasion particles. In particular it is possible by controlling the region of formation either to displace the molten mass formed during friction welding to a location of the coupling 1 which is uncritical with regard to the undesired emission of molten mass or to limit the molten mass formation region such that only the amount of welding deposit required for the formation of a sufficiently solid welded joint is produced.

The control of the molten mass formation region can for example occur in that the contact pressure between the pipe end 2 and the coupling 1 is essentially produced locally in the molten mass formation region. Selective loading of certain coupling regions 1 with the contact pressure results in welding taking place mainly in these regions.

A definite way of controlling the formation region of the molten mass arising during friction welding is offered by the sequence of joining steps illustrated with examples in FIGS. 1 and 2 according to a preferred embodiment of the invention.

FIG. 1 shows that the pipe end 2 and the coupling 1 are brought together in a first step through an essentially linear relative movement. The joining direction is designated with the arrow E, whereby the invention is not limited to the illustrated insertion movement of the pipe end 2. Rather, it is also possible to keep the pipe end 2 stationary and to move the coupling 4 opposite to the insertion direction E shown in FIG. 1 so that an essentially linear relative movement between the two components occurs.

Within the scope of the first step illustrated in FIG. 1, the pipe end 2 and the coupling 1 are moved up to a predetermined position or until a predetermined resistance relative to one another is obtained, whereby the formation region of the molten mass formed in the following second stage by friction welding is controlled.

Generally, the control of the molten mass formation region occurs through a defined, controlled insertion of the pipe end 2 into the coupling 1, whereby a predetermined distance is travelled. Various control quantities can be used to determine this predetermined distance. For example, it is possible to measure the distance travelled or the position of the pipe end with respect to the coupling or vice versa. In addition, it is possible to determine the required distance by measuring the mechanical frictional resistance between the pipe end 2 and the coupling 1, because this resistance increases with increasing distance. It is also possible to control the method via the time.

Once the pipe end 2 and the coupling 1 have been inserted one into the other through the linear relative movement and are thus initially mechanically fixed, in the second step of the method, illustrated in FIG. 2, due to a rotational relative movement between the pipe end 2 and the coupling 1, heat of friction between the two components is generated, which then weld as a result.

To prevent the end of the pipe from melting already in the first step on being inserted into the coupling 1, the linear relative movement within the scope of the first step of the method is executed so slowly and with so little pressure that melting of the pipe end does not occur. It is only in the second step during the execution of the rotational relative movement between the pipe end 2 and the coupling 1 that the speed, i.e. the rotational speed, and the pressure are selectively increased such that welding of the pipe end 2 and of the coupling 1 occur only during the second phase of the method, i.e. during the second step (FIG. 2). Due to the separation of the two process steps, insertion and welding, the situation is achieved in which the molten mass arises exclusively in the region provided for it, that is in the retaining section 7 and not already in the front entry section 6. This technique contributes to the fact that no molten mass can be emitted between the internal connecting piece 3 and the pipe end 2 and enter the pipe end.

The various ways of determining the insertion depth, i.e. the distance, which is determined by the linear relative movement between the pipe end 2 and the coupling 1, are explained further in the following.

To determine the relevant insertion depth, i.e. distance, the special geometries of the respective quick connector or pipe end 2 used within the scope of the method must be considered. Generally applicable is that the maximum insertion depth is limited by the amount of welding deposit required for a sufficiently strong welded joint. If the end of the pipe is inserted too deeply, too much molten mass is produced which is emitted into the inside of the pipe and which leads to unwanted contamination. In most applications the pipe end should be prevented from being fully inserted, i.e. up to the base of the annular groove 5, because in this case the amount of molten mass is too large.

The minimum insertion depth essentially determines the strength of the welded joint, because with less insertion depth the amount of molten mass formed decreases and thus less welding deposit is available for producing the welded joint.

The minimum and maximum insertion depths depend on the geometry and can be determined experimentally for the respective quick connector or the respective combination of quick connector and pipe end. The insertion depth, i.e. the distance determined by the linear relative movement depends for example on the wall thickness of the pipe or line to be joined. When defining the minimum and maximum insertion depths consideration is therefore given as to whether the pipe to be connected exhibits a thick or thin wall thickness.

In the case of a thick-walled pipe, for example with a wall thickness of about 1.1 mm, a sufficiently high contact pressure already exists in the front section of the retaining section 7 for the friction welding, so that a welding section, which is stable in the process and which ensures adequate strength while at the same time preventing the emission of molten mass, is achieved with a shorter insertion depth than with a thin-walled pipe with, for example, a wall thickness of 0.9 mm.

With such a thin-walled pipe with a wall thickness of about 0.9 mm a larger insertion depth must be chosen to achieve sufficient strength in the welded joint. Since less molten mass is formed with thin-walled pipes, the maximum insertion depth is also increased so that overall a deeper insertion of the pipe end in the coupling 1 is possible for thin-walled pipes without an emission of molten mass into the inside of the pipe occurring.

With both thick-walled and thin-walled pipes the optimum region for the insertion depth must be determined in dependence of the respective geometry of the quick connector (for example the diameter of the retention section 7 or the gradient of the transition region 8) which ensures consistent welding of the components with regard to the prevention of contamination of the inside of the pipe and the strength of the joint.

Another way of determining the insertion depth, i.e. the distance, is offered by the measurement of the mechanical frictional resistance between the pipe end 2 and the coupling 1. Other ways of determining this distance are conceivable. For example, the insertion time could be determined. The displacement control has the advantage however that manufacturing tolerances, in particular the length tolerance of the pipe or quick connector can be taken into account, whereby a precise control of the molten mass formation region is facilitated.

When determining the insertion depth or the range of the insertion depth giving consistent process results, material parameters of the respectively used materials can also be taken into account. For example, the material density, temperature conductivity, thermal conductivity, heat transmission coefficient, specific thermal capacity, thermal penetration capability and the linear expansion coefficient can be considered.

A further additional way of controlling the molten mass formation region is to change the diameter of the pipe end in the first step of the method, i.e. when pushing the pipe end 2 onto the coupling 4, in particular to enlarge it. The change in the diameter of the pipe end 2 here occurs along a curved path, which is determined by the profile of the coupling 2, as illustrated in the FIGS. 1 and 2. Due to the deformation of the pipe end along a curved path, stress peaks in the material of the pipe end are avoided and therefore locally unwanted molten mass formation is also avoided in the transition region 8 in the front part of the retaining section 7 which borders the transition region 8.

Particularly with the slow insertion of the pipe end 2 into the coupling 1, changing the diameter of the pipe end along a curved path means that, especially with thick-walled pipes, the formation of the molten mass in the front part of the retaining section 7 or in the transition region 8 is prevented, so that the molten mass principally arises in the rear part of the retaining section 7, which is comparatively uncritical with regard to the unwanted emission of molten mass.

The linear relative movement occurring in the first step can be superimposed by a rotational relative movement, whereby the pipe end or the coupling is heated up. In this way, comparatively more welding deposit is produced during friction welding so that the strength of the welded joint can be increased. In addition, the flaring behaviour of the pipe end 2 and the compressive stresses which can be produced in the material are influenced by the preheating, thus enabling control of the contact pressure.

Another way of controlling the formation region of the molten mass formed during friction welding is to change, in particular enlarge, the diameter of the pipe end 2 before joining to the coupling 1 of the connection device, i.e. before executing the first step. Firstly, the effect of preventing stress peaks in the material is thus reinforced, whereby the formation of molten mass at undesired locations, in particular in the vicinity of the entry section 6, can be prevented.

In addition, the diameter of the pipe end 2 can be enlarged by suitable flaring of the pipe end 2 using a mandrel, not illustrated in FIGS. 1 and 2, such that the diameter of an external surface 2a of the pipe end 2 is formed slightly larger than the diameter of an internal surface 1a of the coupling 1 which comes into contact with the external surface 2a of the pipe end 2. This means that through appropriate flaring of the pipe end 2 the internal surface 4a of the external connecting piece 4 is subjected to a contact pressure by the flared pipe end 2 such that a welded joint between the external surface 2a of the pipe end 2 and the internal surface 4a of the external connecting piece 4 can be produced by a rotational relative movement.

In contrast to the embodiment illustrated in FIG. 2, the pipe end 2 does not contact the internal connecting piece 3, but rather the external connecting piece 4. The molten mass formed during friction welding arises in the joint region between the external surface 2a of the pipe end 2 and the internal surface 4a of the external connecting piece 4. In this way any excess of molten mass formed between the pipe end 2 and the external connecting piece 4 is emitted into free space and does not penetrate into the inside of the pipe. This embodiment of the method according to the invention offers improved process reliability.

Furthermore it is possible to impress a certain shape on the pipe end 2 during flaring, whereby different compressive stresses, which result in favourable contact pressure behaviour of the pipe end 2, can be introduced into the material of the pipe end 2.

For example, the pipe end 2 can be deformed such that the diameter in the exit section of the pipe end 2 (rear end of the pipe in the insertion direction E) is slightly smaller than the diameter in a front section of the pipe end 2 in the insertion direction E. The pipe end 2 then exhibits a slightly conical shape which narrows in the insertion direction E. Due to the conical shape of the pipe end 2, the contact pressure of the pipe end 2 on the retaining section 7 in the insertion direction E increases and attains its maximum value at the point of the smallest diameter of the conically shaped pipe end 2, i.e. in the rear part of the retaining section 7. Thus, the molten mass formation during friction welding in the rear part of the retaining section 7 is supported.

The step in the process of flaring the pipe end 2 before insertion into the coupling 4 can be combined with the previously explained embodiments.

Moreover, the region of molten mass formation can be controlled in that the external surface 3a of the internal connecting piece 3 or the internal surface 4a of the external connecting piece 4 can be provided with a lubricant. This embodiment is particularly suitable for a combination of pipe end 2 and coupling 4 in which the pipe end 2 contacts both sides on the internal connecting piece 3 and on the external connecting piece 4. The application of a lubricant on one of the two contact surfaces of the internal connecting piece 3 and the external connecting piece 4 causes in each case the heating of a surface, preferably the internal surface 4a of the external connecting piece 4, due to the frictional forces, so that welding only occurs on that surface not provided with lubricant.

Additionally, it is possible to provide lubricants at critical parts of the respective contact regions between the pipe end 2 and the coupling 4, for example the transition region 8 and the front part of the retaining section 7 bordering the transition region 8. Also in this way molten mass is prevented from being formed in the critical regions so that molten mass formation is limited to parts which are not critical with regard to the emission of molten mass.

A combination of the previously explained embodiments is possible. For example, before the first step of the multi-step method, the pipe end can be flared, whereby the transition region 8 and the front part of the retaining section 7 bordering the transition region 8 are provided with the lubricant.

The invention is suitable, without being thereby restricted, in particular for the connection of fuel pipes, because with the aid of the invention the production of welding beads, which penetrate into the inside of the pipe, can be effectively prevented or at least reduced.

The invention claimed is:

1. Method for connecting pipes comprising:
    connecting a pipe end with a coupling of a connection device for pipes, through friction welding and
    controlling of the region of formation of a molten mass formed during friction welding by enlarging a diameter at the pipe end before insertion to the coupling of the connection device so that the pipe end has a conical shape, the conical shaped portion being friction welded to the coupling.

2. Method according to claim 1, wherein a contact pressure between the pipe end and the coupling is produced essentially locally in the molten mass formation region.

3. Method according to claim 1 wherein the pipe end and the coupling
    are brought together in a first step by an essentially linear relative movement, wherein the pipe end and the coupling are moved together relative to one another up to a predetermined position or until a predetermined resistance is obtained and
    in a second step are welded by an essentially rotational relative movement under pressure.

4. Method according to claim 3, wherein the essentially linear relative movement is displacement controlled.

5. Method according to claim 4, wherein the displacement control of the essentially linear relative movement occurs in dependence of the wall thickness and/or the diameter of the pipe end.

6. Method according to claim 5, wherein the distance which is determined by the displacement controlled, essentially linear relative movement is reduced with increasing wall thickness of the pipe end.

7. Method according to claim 3, wherein the first step the essentially linear relative movement is superimposed by a rotational relative movement to heat up the pipe end and the coupling.

8. Method according to claim 1, wherein by changing the diameter of the pipe end, different diameters are formed in the longitudinal direction of the pipe end.

9. Method according to claim 1, wherein the diameter of the pipe end is enlarged such that the diameter of an external surface of the pipe end before insertion is formed slightly larger than the diameter of an internal surface of the coupling which comes into contact with the external surface of the pipe end.

10. Method according to claim 1, wherein the contact surfaces of the pipe end and/or of the coupling are provided with a lubricant, at least in some parts.

11. The method according to claim 1, wherein the coupling is a quick connection.

* * * * *